United States Patent
Dentel et al.

(10) Patent No.: US 7,014,301 B2
(45) Date of Patent: Mar. 21, 2006

(54) PRINTING DEVICE CONFIGURED TO RECEIVE A PLURALITY OF DIFFERENT CARTRIDGE TYPES

(75) Inventors: Stephen D. Dentel, Vancouver, WA (US); Donald J. Welch, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 272 days.

(21) Appl. No.: 10/631,917

(22) Filed: Jul. 30, 2003

(65) Prior Publication Data

US 2005/0024416 A1    Feb. 3, 2005

(51) Int. Cl.
*B41J 2/175* (2006.01)
*B41J 29/393* (2006.01)

(52) U.S. Cl. .......................................... 347/85; 347/19

(58) Field of Classification Search ............ 347/84–87, 347/19
See application file for complete search history.

(56) References Cited

U.S. PATENT DOCUMENTS

| 5,461,705 | A | | 10/1995 | Wakabayashi et al. |
| 5,553,202 | A | | 9/1996 | Wakabayashi et al. |
| 5,613,625 | A | * | 3/1997 | Specht ....................... 222/180 |
| 5,933,164 | A | * | 8/1999 | Sato et al. .................... 347/43 |
| 6,151,041 | A | * | 11/2000 | Bolash et al. ................. 347/19 |
| 6,273,661 | B1 | * | 8/2001 | Payne ............................ 412/8 |
| 6,467,869 | B1 | * | 10/2002 | Merz et al. ................... 347/19 |
| 6,565,184 | B1 | * | 5/2003 | Numata et al. ............... 347/23 |
| 6,631,967 | B1 | * | 10/2003 | Saruta ......................... 347/19 |

* cited by examiner

*Primary Examiner*—Stephen D. Meier
*Assistant Examiner*—An H. Do

(57) ABSTRACT

A system for altering function of a printing device is provided. The system includes a printing device having a cartridge slot configured to receive any of a plurality of different cartridge types, and a computing device including a processor, wherein the processor is linked to the printing device and is configured to control operation of the printing device. The system further includes first instructions loadable on the computing device. The first instructions are specific for a first cartridge type and control operation of a first cartridge of the first cartridge type when the first cartridge is disposed in the cartridge slot of the printing device.

23 Claims, 4 Drawing Sheets

PRINTING DEVICE CONFIGURED TO RECEIVE A PLURALITY OF DIFFERENT CARTRIDGE TYPES

BACKGROUND

Print cartridges, or pens, are used in many types of printers, such as inkjet printers. Typically, these print cartridges are configured to be positioned within a cartridge slot within the printer. During use, ink (such as black or colored ink) contained within an ink reservoir or ink reservoirs in the print cartridge may be passed through the print cartridge to a medium, thereby applying ink to the medium, resulting in a printed medium.

Print cartridges are adapted to generate a print or printed image. Typically, print cartridges include black or colored ink. The ink may be selectively released from the print cartridge to generate a black and white image and/or a colored image. For example, some print cartridges may have a single ink reservoir such that actuation of the print cartridge results in release of a single color. Other print cartridges may have multiple ink reservoirs. Each ink reservoir may be a different color, such that actuation of the print cartridge results in selective release of different colors to produce a color print.

Various printer brands have proprietary print cartridges. These proprietary print cartridges are adapted to fit within only a select group of printers. Thus, in many situations, a user must replace a used print cartridge with an identical print cartridge specifically intended for use with the corresponding printer type.

DETAILED DESCRIPTION

Figure 1:
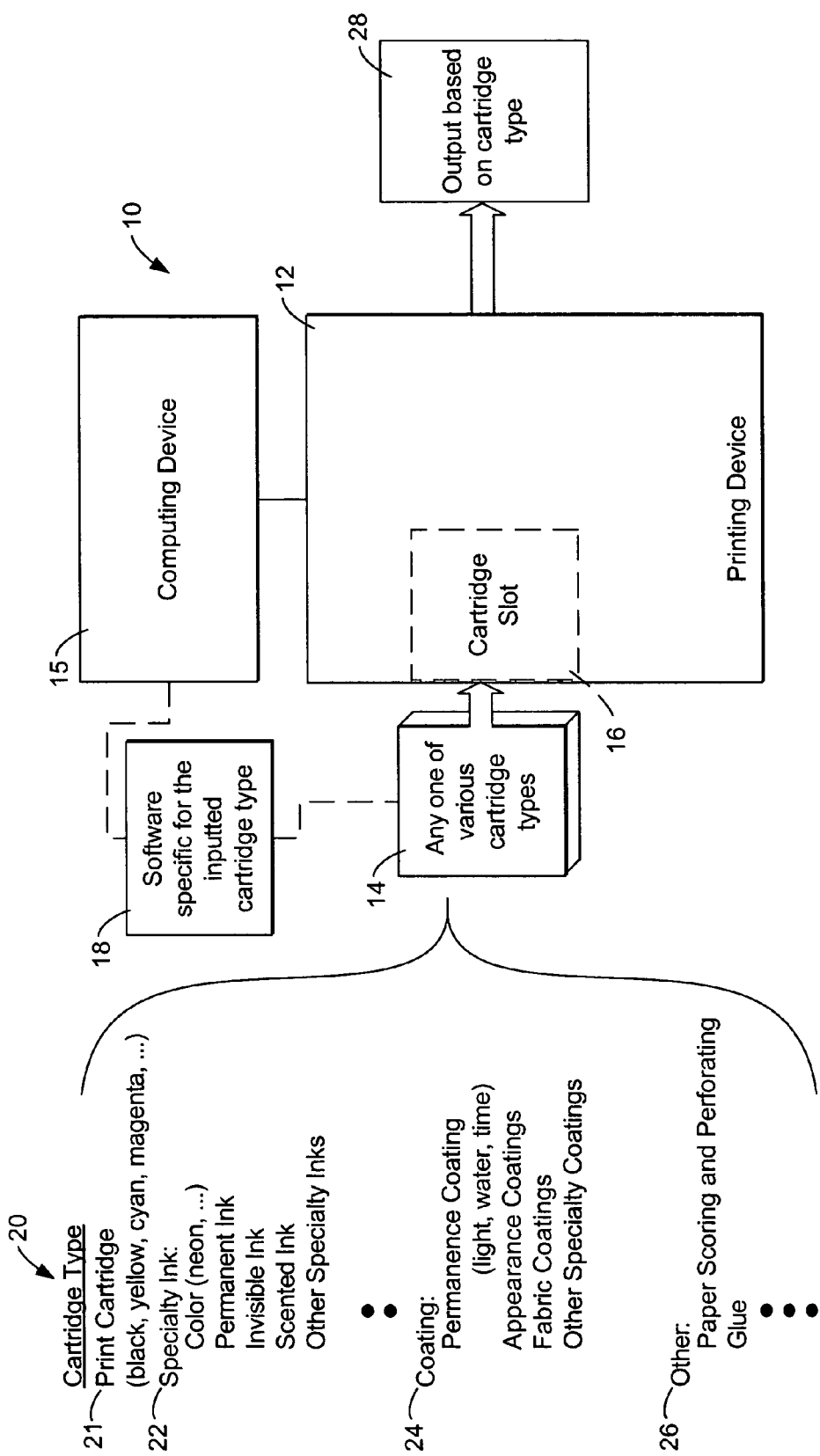
FIG. 1 is a somewhat schematic block diagram of a system for utilizing an accessory cartridge to produce modified media according to an embodiment of the present invention.

Referring initially to FIG. 1, a system according to an embodiment of the present invention is shown generally at 10. System 10 includes a printing device 12 adapted to receive a cartridge 14. Printing device 12 may be any suitable type of printing device that employs a print cartridge or pen. For example, printing device 12 may be a desktop printer, an inkjet printer, a multi-functional printer, a commercial printing press, a laser printer or other suitable printing device. Furthermore, while printing device 12 typically is configured to print on sheet media, such as paper, it should be appreciated that the printing device may be configured to print on any other desired type of media, such as fabric or plastic.

In some embodiments, printing device 12 may be linked to a computing device 15. Computing device, as used herein, includes, any computing device or computer with a processor and memory, including, but not limited to, portable computers, hand-held computers, desktop computers, servers, etc. The computing device may also be integrated within the printing device. Typically, the computing device is capable of transmitting an image to the printing device. In some embodiments, both printing device 12 and computing device 15 may be linked to a network (not shown). Such a network may enable printing device 12 to receive electronic messages and files stored on the network. However, it should be appreciated, that in some embodiments, printing device 12 may be a non-networked device. Additionally, in some embodiments, computing device 15 may be a camera or other image-generation device that may be directly linked to printing device 12.

Printing device 12 typically includes a cartridge slot 16 configured to receive a cartridge 14. As described in more detail below, cartridge slot 16 may be a universal cartridge slot adapted to receive different cartridge types. For example, cartridge slot 16 may be adapted to receive both standard print cartridges as well as accessory cartridges (cartridges configured to produce a specialty effect). It should be appreciated that standard print cartridges are referred to herein as being of a single cartridge type. Thus, standard cartridge slots are configured to receive only a single cartridge type, standard print cartridges. In contrast, the cartridge slot, described herein, is configured to receive any one of a plurality of different cartridge types, such as, but not limited to, standard print cartridges and accessory cartridges. It should be appreciated that such a universal cartridge slot may be configured to receive some, but not all, different cartridge types. For example, in some embodiments, printing device 12 may include a universal cartridge slot adapted to receive only accessory cartridges or only selected accessory cartridges.

Thus, any one of a plurality of different types of cartridges may be operably disposed within the cartridge slot. Exemplary cartridge types are shown at 20. As described above, standard print cartridges (indicated at 21) are considered herein to be of a single cartridge type. Typically, a standard print cartridge is adapted to release black to create a black-and-white print, and/or colored ink (such as cyan, yellow, magenta, etc.) to create a colored print. Other cartridge types may include any of a variety of accessory cartridges. Each accessory cartridge may be adapted to create a specific specialty effect. The specialty effect may include any significant modification of the medium, outside that provided by a standard print cartridge. The specialty effect may be a visual effect, an olfactory effect, a medium enhancement effect (such as a permanence coating) or a craft effect (such as glue or perforation). For example, the accessory cartridges may be configured to apply specialty inks, coatings or other treatments to a medium.

The cartridge types may include standard ink cartridges 21 and specialty ink cartridges 22. The specialty ink cartridges may be configured to dispense specialty inks onto a medium. Each of the specialty ink cartridges may be a different cartridge type producing a different specialty effect. Examples of specialty ink cartridges may include specialty color cartridges configured to dispense specialty colors, such as neon colors. Other specialty ink cartridges may be configured to dispense different types of ink, such as permanent ink or washable ink or different ink compositions. Moreover, other specialty ink cartridges may be configured to dispense scented ink or other novelty ink, such as invisible ink.

Another type of specialty cartridge that may be received within cartridge slot 16 may be a coating cartridge 24 configured to apply a medium enhancement effect to the medium. Coating cartridges may be configured to apply a coating to a medium as the medium is moved relative to the cartridge. For example, the cartridge may be configured to apply a permanence coating that may improve the permanence of a print over time. Other coatings may improve a print's resistance to light, water, etc. Some coating cartridges may provide coatings that alter or modify the print's appearance. For example, the coating may make the print appear old or antiquated. Similarly, some coatings may make the print appear as if it is a watercolor, an oil painting, a charcoal paint, etc. Other coating cartridges may be specifically adapted for particular mediums. For example, a coating cartridge may include a fabric coating to improve the durability of fabric prints. Similarly, other coating cartridges may improve the weatherproofing and wearability of a fabric or other material. It should be appreciated that each of the different coating cartridges, which produce different specialty effects on a medium, may be understood to be a different cartridge type.

As described above, other specialty cartridge types (indicated at 26) may be configured to produce a craft effect on the medium. For example, some specialty cartridges may be configured to score and/or perforate a medium. Similarly, other accessory cartridges may be glue cartridges adapted to selectively position glue or other substances on the media. Likewise, some accessory cartridges may be specifically adapted to emboss a design on a medium or otherwise alter the medium.

The above-cartridge types are described for illustrative purposes and are not intended to be limiting. Thus, it should be appreciated that other types of cartridges producing other specialty effects are within the scope of this disclosure.

Each of the different cartridge types may be controlled through control software or program 18, which may be specific to the cartridge or the cartridge type. The control software may include cartridge-operation instructions. Control software 18 may reside in a computing device, such as a personal computer (shown at 15), that is linked to printing device 12. Alternatively, in some embodiments, control software 18 may reside on printing device 12. For example, the control software may be loaded into the computing device or printing device. Alternatively, in some embodiments, control software 18 may reside in the accessory cartridge. The control software, including the cartridge-operation instructions, may be loaded into the printing device and/or computing device when the accessory cartridge is installed into the printing device. Typically, control software 18 controls and manages the use of the various types of cartridges. The control software may be designed and adapted for each different cartridge type.

In some embodiments, the control software may provide options related to the use of a specific cartridge type. For example, the control software may provide for user-selectable options related to the generation of the effect produced by the cartridge type. The control software further may provide for presentation of a preview of the image to be printed including the specialty effect. Upon selection of an image to be printed, the control software may transmit data, including instructions regarding application of the specialty effect, to the printing device to actuate the respective cartridge.

In operation, a user may select a cartridge 14 and position the cartridge within the appropriate cartridge slot 16 in printing device 12. Lower level electrical characteristics of the cartridge may be exposed to a drive interface (not shown), which in combination with control software 18, controls cartridge 14. During use, media may be fed into printing device 12 using conventional media advance mechanisms, such as media feeders. Direction to cartridge 14, from control software 18, may cause the cartridge to function in accordance with the type of cartridge. For example, a specialty ink cartridge may dispense specialty ink, while a coating cartridge may dispense a coating onto a medium, each according to a specialized dispensing routine. Similarly, a craft cartridge may modify the medium in accordance with the type of cartridge, e.g. dispense glue, perforate, score or otherwise alter the medium as the medium is advanced through the printing device. The resulting output, at 28, may be modified in accordance with the type of cartridge inserted within the cartridge slot. For example, output 28 may be printed with standard ink, specialty ink, coated with a selected coating, perforated and/or scored, etc.

Figure 2:
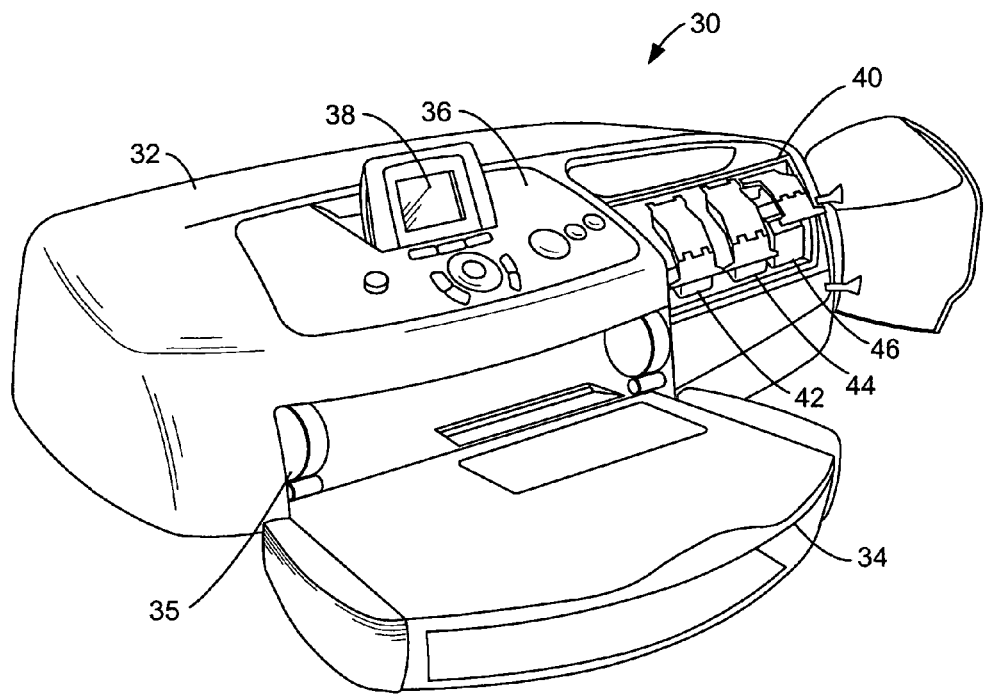
FIG. 2 is an isometric view of a printer having a plurality of cartridge slots according to an embodiment of the present invention.

FIG. 2 discloses a printer indicated generally at 30. As described above, although printer 30 is depicted as a desktop printer, it should be appreciated that printer 30 may be any suitable printing device, large or small. Printer 30 includes a body 32, which may include a media tray 34 or other suitable media input unit configured to hold sheet media or other media types. The media may be fed into the printer from the media tray via a media advance mechanism, indicated generally at 35. Typically, the media advance mechanism includes one or more rollers for moving a media sheet or other media through the printer.

Body 32 further may include a control panel 36. Control panel 36 may be configured to enable a user to direct the printer to operate in a desired manner. For example, the control panel may enable a user to select a desired operation or function. Typically, control panel 36 includes a series of user input devices, e.g. buttons, which allow the user to select a desired function, including functions related to the insertion of an accessory cartridge and use of the accessory cartridge. In some embodiments, body 32 further may include a preview screen or display 38, which enables a user to preview, edit and/or modify an image prior to printing the image on a selected medium.

Printer 30 also may include a carriage 40 including one or more cartridge slots configured to support one or more cartridges. For example, in the depicted embodiment, carriage 40 includes three cartridge slots having three cartridges 42, 44 and 46. One or more of these cartridge slots may be universal cartridge slots. During operation, carriage 40 may be moved side-to-side across a medium. As the carriage 40 is drawn across the medium, the cartridges disposed within the carriage may be configured to dispense a substance or otherwise modify a medium as the medium is advanced through the printer. Although only one carriage is described in detail in the present disclosure, more than one carriage may be included within printer 30. For example, a first carriage may include cartridge slots for standard print cartridges, while a second carriage may include one or more cartridge slots for one or more accessory cartridges.

In some embodiments with multiple cartridge slots, the release of ink from a standard print cartridge may be followed immediately by the application of a specialty effect from a specialty cartridge. Alternatively, the specialty effect may be applied via the specialty cartridge prior to the release of ink from the standard print cartridge. In some embodiments, the media may be repositioned for application of the specialty effect. Likewise, other configurations may affect the timing of the application of the specialty effect relative to release of ink from the standard print cartridges. For example, a universal cartridge slot may be offset from the standard slots in the media-advancement direction, such that the release of ink occurs spatially from the application of the specialty effect. Such an offset may help facilitate the drying of the ink or specialty effect prior to application of the specialty effect, or vice versa. For example, the offset may enable ink released from a standard print cartridge to dry prior to application of a coating from a coating cartridge.

Figure 3:
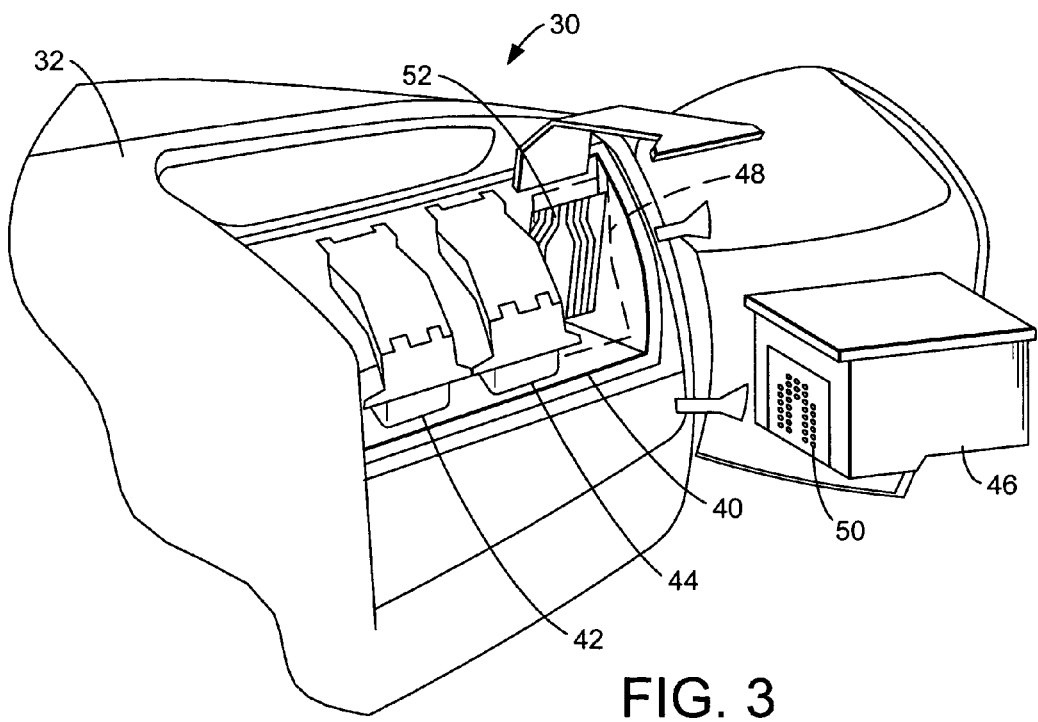
FIG. 3 is an exploded cut-away view of the printer of FIG. 2 showing an accessory cartridge and a cartridge slot for the accessory cartridge according to an embodiment of the present invention.

FIG. 3 further illustrates printer 30. Specifically, FIG. 3 illustrates an accessory cartridge 46 configured to be positioned within a universal cartridge slot 48. Accessory cartridge 46 may include electrical contacts, such as cartridge contacts 50, which are configured to correspond to selected control contacts 52 in universal slot 48 of printer 30. These contacts provide for communication between the printer and the cartridge registered in the universal cartridge slot. Operation of the cartridge thus may be directed by control software disposed on the printer, or on a linked computing device.

Figure 4:
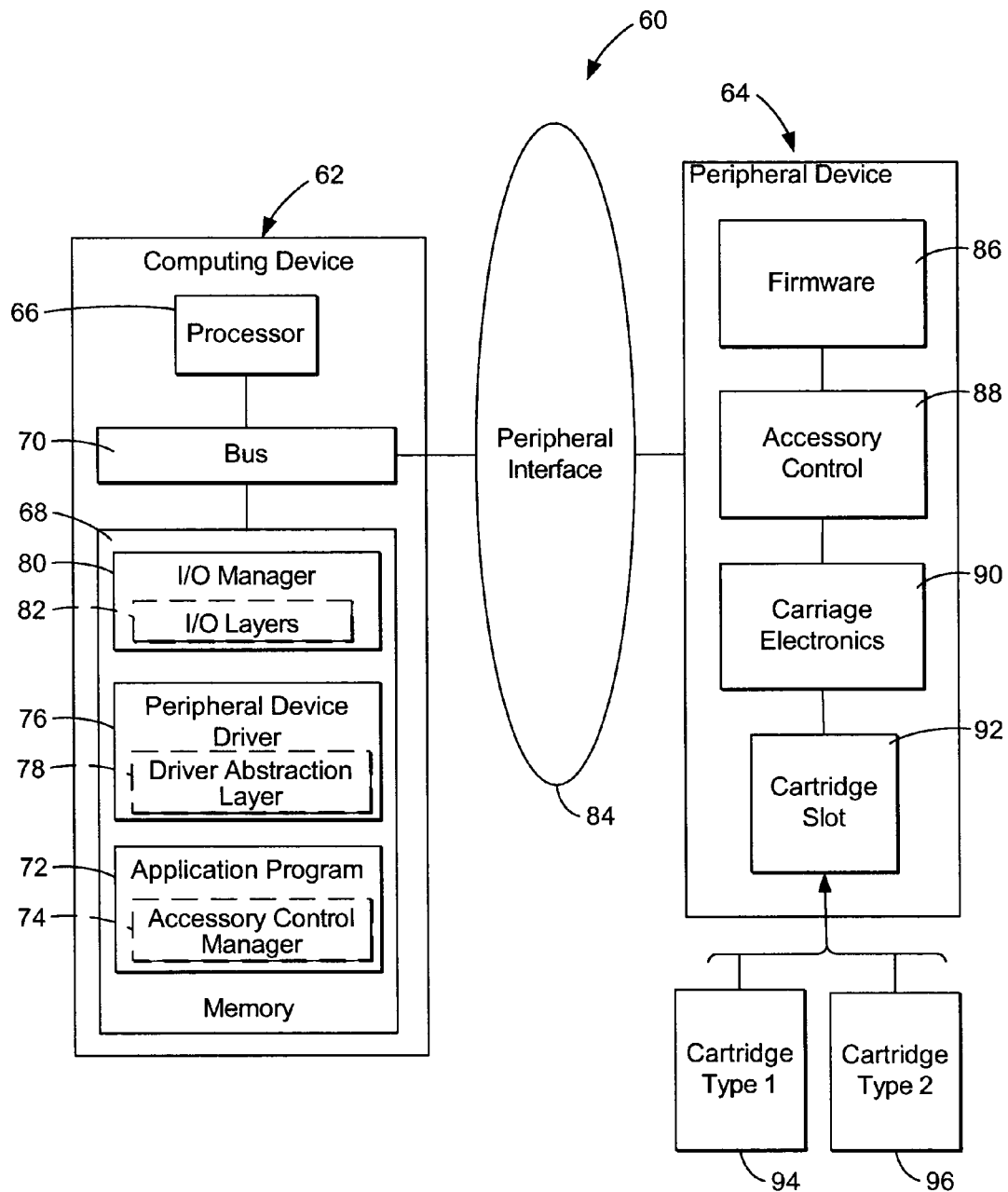
FIG. 4 is a simplified block diagram of a client system and a peripheral device according to an embodiment of the present invention.

A simplified block diagram of the present system is indicated generally at 60 in FIG. 4. The system includes a computing device, indicated at 62, and a peripheral device, such as a printer, indicated at 64. In its most basic form, the computing device includes a processor 66 and memory 68. A bus 70 may link processor 66 and memory 68. The computing device may be a personal computer, a portable computer or other suitable computing device in communication with the peripheral device.

The connection between the computing device and the peripheral device may be a wired or wireless connection, both of which are represented by peripheral interface 84 in FIG. 4. Alternatively, in some embodiments, the computing device may be integrated within the peripheral device.

Processor 66 may take the form of a central processing unit or other suitable processor for directing the operation of peripheral device 64. Processor 66 may be configured to provide a user interface, which may accommodate user selection and instruction of the peripheral device, including the operation of a cartridge inserted in the peripheral device. Processor 66 may manage operation of application program 72, peripheral device driver 76 and/or I/O manager 80. For example, the processor may communicate user instructions to the peripheral device through I/O manager 80. Each of these programs/applications (application program 72, peripheral device driver 76 and I/O manager 80) may be resident in memory 68. It should be understood that memory 68 may include any type of memory, including mass storage devices.

Memory 68 may include both volatile memory and non-volatile memory. Non-volatile memory may be utilized for such functions as storing device or cartridge software, fonts and other permanent or semi-permanent data. The non-volatile memory may be any suitable type of non-volatile memory, including, but not limited to, ROM, PROM, EPROM, EEPROM, Flash memory and combinations thereof. Memory 68 further may include volatile memory, which may be configured to temporarily store an electronic image. The volatile memory also may be configured to store user instructions regarding printing of the electronic image and use of the accessory cartridge. Volatile memory may include one or more suitable types of volatile memory, such as SRAM or DRAM.

Computing device 62, through processor 66 and memory 68, may be configured to run an application program 72. As described above, application program 72 may be resident in within memory 68 of computing device 62. Alternatively, application program 72 may be resident in memory on peripheral device 64. As used herein, application program 72 may be a software program or other program adapted to control and manage operation of an accessory cartridge inserted within a peripheral device. For example, application program 72 may provide information and/or user-selectable options related to use of a specific cartridge type. For example, an application program associated with a coating cartridge may enable a user to select the number of applications of a coating, the heaviness or lightness of the application of the coating, an area within an image to apply a coating, etc. Similarly, an application program associated with a glue cartridge may provide options related to the dispensing of glue, including the area of application of glue, the amount of glue, the type of application, etc. Likewise, other applications programs may include additional options related to the particular specialty effect produced by the associated cartridge.

Information regarding a user-selected cartridge operably disposed in a printer may be transmitted to the user through a user interface. In some embodiments, the application program may enable a user to create, edit, display and/or preview an electronic image of a print prior to actually printing or otherwise modifying the medium using the specialty cartridge. Electronic image, as used herein, may include any type of electronic document suitable for printing, including, but not limited to, text-based documents, graphic documents, photographs, drawings, figures, charts, etc. The electronic image may be transferred to the printer as print data.

Application program 72 may be specific for a particular cartridge type. Associated with the application program, or integrated within the application program, may be an accessory control manager 74, which may be configured to direct operation of the associated accessory cartridge. For example, the accessory control manager may send command codes (unique to a specific type of cartridge) to the accessory control (shown at 88) to actuate the respective type of accessory cartridge within the peripheral device. Thus, an accessory control manager for a glue cartridge may send command codes directed to effect the release of glue onto a medium. Likewise, an accessory control manager for a coating cartridge may send command codes directed to effect the application of a coating onto a medium. As with the application program, the accessory control manager may be disposed within memory on the computing device or on the peripheral device.

In operation, application program 72 may enable a user to select options related to a specific cartridge. The accessory control manager may send cartridge-operation instructions based on a user's selection options. The cartridge operation instructions may include cartridge-specific commands for the cartridge.

The computing device further may include a peripheral device driver 76. The peripheral device driver may be a program, such as a print driver, which controls the peripheral device. The program may be resident on memory 68 or in some other suitable portion of the computing device. Peripheral device driver 76, in combination with application program 72 and accessory control manager 74, may control operation of a cartridge inserted within peripheral device 64. The peripheral device driver may be configured to translate the cartridge-specific commands from application program 72 and accessory control manager 74 into device-interpretable commands. Thus, the application program can generate commands that are generic relative to the type of peripheral device. Peripheral device driver 76 and one or more driver abstraction layers 78 encode the commands from application program 72 and accessory control manager 74 such that the commands are interpretable by the specific peripheral device.

Data from the application program, including print data and cartridge-operation instructions/commands, may be translated by peripheral device driver 76 and sent to the peripheral device 64 via an I/O manager 80 and associated I/O layers 82. The I/O manager and I/O layers may include any program, operation or device adapted to transfer data/commands to the printer. The I/O manager may be linked to processor 66 via bus 70 and may reside within memory 68.

Peripheral device 64 may include firmware 86, accessory control 88 and carriage electronics 90. The firmware typically controls operation of the peripheral device. The accessory control and carriage electronics control the operation of the carriage and the associated cartridge. The firmware may include a program, which may be resident in the peripheral device, which is adapted to convert print data and instruction data from the computing device to a form that may be sent to the carriage electronics to activate operation of the inserted cartridge to produce the desired image and effects on a medium. Activation may include sending one or more enabling signals to the carriage electronics and cartridge.

For example, the firmware, accessory control and carriage electronics may control movement of the carriage and operation of the cartridge contained within cartridge slot 92 of the peripheral device. Any one of a plurality of cartridges may be controlled using the system described in FIG. 4. For example, a user may select between cartridge type 1 (94) and cartridge type 2 (96). Positioning either cartridge within cartridge slot 92 may enable a user to control operation of the cartridge and creation of a specialty effect, on a medium. For example, a standard ink cartridge may be positioned within cartridge slot 92, such that actuation of the ink cartridge results in ink being dispensed on the medium. Similarly, a different cartridge type, such as a coating cartridge, may be positioned within cartridge slot 92, such that actuation of the coating cartridge results in a protective coating being spread on the medium. Likewise, actuation of a glue cartridge may result in the release of glue onto the medium. Although only one cartridge slot is illustrated, it should be appreciated that there may be one, two or more cartridge slots, which may be independently operable.

Figure 5:
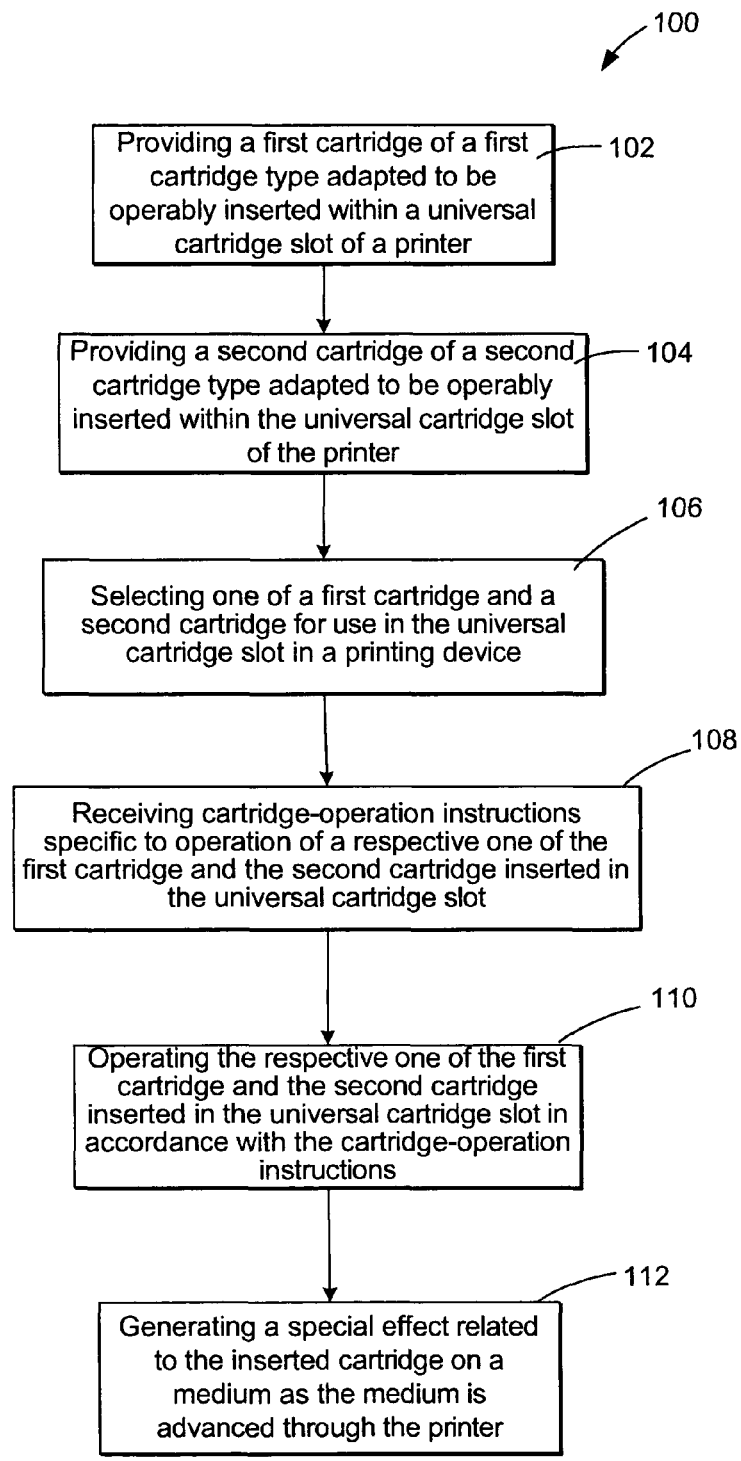
FIG. 5 is a flow diagram of a method of generating a modified output using an accessory cartridge according to an embodiment of the present invention.

FIG. 5 shows, generally at 100, a method of altering the function of a printer. The method includes, at 102, providing a first cartridge adapted to be inserted within a universal cartridge slot of the printer. The first cartridge may be a first cartridge type and may be configured to produce a first specialty effect on a medium. The method further includes, at 104, providing a second cartridge adapted to be inserted within the universal cartridge slot of the printer. The second cartridge may be a second cartridge type and may be configured to produce a second specialty effect on the medium. The method further may include selecting one of the first and second cartridge and inserting the selected one of the first cartridge and the second cartridge in a cartridge slot in the printer (at 106). The method further includes receiving cartridge-operation instructions specific to the operation of a respective one of the first cartridge and the second cartridge inserted in the cartridge slot (at 108) and operating the respective one of the first cartridge and the second cartridge inserted in the universal cartridge slot in accordance with the cartridge-operation instructions (at 110). Operation of the cartridge results in generation of a specialty effect related to the inserted cartridge on a medium as the medium is advanced through the printer (at 112).

While the present description has been provided with reference to the foregoing embodiments, those skilled in the art will understand that many variations may be made therein without departing from the spirit and scope defined in the following claims. The description should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring, nor excluding, two or more such elements.

What is claimed is:

1. A system for altering a function of a printing device, the system comprising:
    a printing device having a cartridge slot configured to receive any of a plurality of different cartridge types, wherein the cartridge is adapted to communicate the cartridge type to the printing device, and wherein the printing device is configured to identify the cartridge type of the cartridge received in the cartridge slot;
    a computing device including a processor, wherein the processor is linked to the printing device and is configured to control operation of the printing device; and
    first instructions loadable on the computing device in response to the identification, by the printing device, of a first cartridge having a first cartridge type being received in the cartridge slot, wherein the first instructions are specific for the first cartridge type and control operation of the first cartridge when the first cartridge is disposed in the cartridge slot of the printing device.

2. The system of claim 1, further comprising:
    second instructions loadable on the computing device in response to the identification, by the printing device, of a cartridge having a second cartridge type being received in the cartridge slot, wherein the second instructions are specific for the second cartridge type and control operation of the second cartridge when the second cartridge is disposed in the cartridge slot of the printing device;
    wherein the first instructions are different than the second instructions; and
    wherein the first cartridge type is different than the second cartridge type.

3. The system of claim 1, wherein the first instructions are non-specific to the printing device, the system further comprising a printing device driver configured to translate cartridge-specific instructions to printing-device-interpretable instructions.

4. The system of claim 1, wherein the first instructions are resident in memory on the computing device.

5. The system of claim 1, wherein the first instructions are resident on a mass storage device on the computing device.

6. The system of claim 1, wherein the computing device is integrated within the printing device.

7. The system of claim 1, wherein the first instructions are configured to provide user-selectable options regarding the use of the first cartridge type.

8. The system of claim 1, wherein the different cartridge types may be selected from a group consisting of a coating cartridge, a specialty ink cartridge and a craft cartridge.

9. A printer comprising:
- a cartridge slot adapted to receive any of plural cartridges of different cartridge types;
- a cartridge received within the cartridge slot; and
- instructions specific to each of the different cartridge types, the instructions being adapted to control operation of the cartridge and being loadable in response to the identification, by the printer, of the cartridge type,
- wherein the printer is adapted to function to produce an effect based on the type of cartridge in the cartridge slot.

10. The printer of claim 9, wherein the plurality of different cartridge types includes a standard ink cartridge and a specialty ink cartridge, the cartridge slot being adapted to receive either of the standard ink cartridge and the specialty ink cartridge.

11. The printer of claim 9, wherein the plurality of different cartridge types includes a specialty ink cartridge, and where the effect based on the type of cartridge is a specialty olfactory effect.

12. The printer of claim 9, wherein the plurality of different cartridge types includes a specialty craft cartridge, and where the effect based on the type of cartridge is a specialty craft effect.

13. The printer of claim 12, wherein the specialty craft effect includes at least one of perforating a medium, scoring the medium, and dispensing glue on the medium.

14. The printer of claim 9, wherein the plurality of different cartridge types includes a specialty coating cartridge, and where the effect based on the type of cartridge includes dispensing a protective coating on a medium.

15. A method of changing the function of a printing device, the method comprising:
- providing one of a first cartridge and a second cartridge, each for use in a same cartridge slot in a printing device, wherein the first cartridge is of a first cartridge type configured to produce a first specialty effect on a medium, and the second cartridge is of a second cartridge type configured to produce a second specialty effect on a medium;
- identifying the cartridge type of a respective one of the first cartridge and the second cartridge inserted in the cartridge slot;
- responsive to identifying the cartridge type, receiving cartridge-operation instructions specific to operation of a respective one of the first cartridge and the second cartridge inserted in the cartridge slot; and
- operating the respective one of the first cartridge and the second cartridge inserted in the cartridge slot in accordance with the cartridge-operation instructions to produce the respective specialty effect on a medium as the medium is advanced through the printing device.

16. The method of claim 15, further comprising loading control software containing the cartridge-operation instructions on a computing device linked to the printing device.

17. The method of claim 15, wherein at least one of the first cartridge and the second cartridge may be selected from a group consisting of a specialty coating cartridge, a specialty ink cartridge and a specialty craft cartridge.

18. A program storage device readable by a machine, the storage device tangibly embodying a program of commands executable by the machine to:
- identify, from a plurality of different cartridge types, a cartridge type of a cartridge operably disposed in a printing device as being configured to produce a desired specialty effect;
- load instructions specific to the cartridge type; and
- direct operation of the cartridge by sending cartridge-operation instructions from a processor to the printing device to produce the desired specialty effect on a medium as the medium is advanced through the printing device.

19. The program storage device of claim 18, where the different cartridge types are selected from a group consisting of a specialty coating cartridge, a specialty ink cartridge and a specialty craft cartridge.

20. The program storage device of claim 18, further comprising commands executable to provide options to a user regarding operation of the cartridge and application of a specialty effect to a medium.

21. A printing device adapted to produce a plurality of different effects, the printing device comprising:
- a slot for receiving any of a plurality of different cartridge types, each cartridge type configured to produce a different effect and to be operably disposed within the printing device;
- means for identifying the cartridge type of the cartridge operably disposed within the slot;
- means for programming the printing device to operate any of the plurality of different cartridge types when operably disposed within the slot; and
- means for operating any of the plurality of different cartridge types when operably disposed within the slot to produce a selected effect on a medium, the selected effect associated with the cartridge type operably disposed within the slot.

22. A kit for a printing system, wherein the printing system includes a computing device having a processor and a printing device, the kit comprising:
- an accessory cartridge having a cartridge type selected from a plurality of different cartridge types and configured to be positioned within a universal cartridge slot in the printing device, the accessory cartridge configured to communicate the cartridge type to the printing system and to generate a specialty effect; and
- instructions loadable on the computing device and operable by the processor, upon identification of the cartridge type, the instructions being specific to the type of the accessory cartridge and configured to operate the accessory cartridge to produce a specialty effect on a medium when the accessory cartridge is positioned within the universal cartridge slot in the printing device.

23. The kit of claim 22, wherein the instructions loadable on the computing device are non-specific to the printing device.

* * * * *